United States Patent [19]

Fudge

[11] 4,258,940
[45] Mar. 31, 1981

[54] SEALING CONNECTOR FOR LIQUID AND GAS SYSTEMS
[75] Inventor: David C. Fudge, Irvine, Calif.
[73] Assignee: Bio-Dynamics, Inc., Indianapolis, Ind.
[21] Appl. No.: 16,429
[22] Filed: Mar. 1, 1979
[51] Int. Cl.³ .............................................. F16L 39/00
[52] U.S. Cl. .................................. 285/137 R; 285/307; 403/353
[58] Field of Search ........... 285/307, 325, 305, 137 R; 403/353; 251/292, 352; 137/616

[56] References Cited
U.S. PATENT DOCUMENTS

| 608,000 | 7/1898 | Leatherman et al. . | |
|---|---|---|---|
| 1,260,734 | 3/1918 | Vawter | 285/325 X |
| 2,098,423 | 11/1937 | Kennedy . | |
| 2,396,747 | 3/1946 | Parrott | 403/353 |
| 2,641,272 | 6/1953 | Seale | 285/305 X |
| 2,701,147 | 2/1955 | Summerville | 285/307 X |
| 2,794,961 | 6/1957 | Knight . | |
| 2,998,990 | 9/1961 | Plattsmier et al. | 403/353 X |
| 3,066,614 | 12/1962 | Grandstaff | 403/353 X |
| 3,462,179 | 8/1969 | Hinkle . | |
| 3,499,670 | 3/1970 | DeWoody | 285/355 |
| 3,588,149 | 6/1971 | Demler, Sr. . | |
| 3,886,970 | 6/1975 | Barlow et al. . | |
| 3,926,187 | 12/1975 | Inglesias | 251/352 |

Primary Examiner—Thomas F. Callaghan
Attorney, Agent, or Firm—Woodward, Weikart, Emhardt & Naughton

[57] ABSTRACT

A liquid or gas system connector, which is easily attachable and detachable, and provides a seal to avoid undesirable leakage when in the connected position. The connection is accomplished by guiding a first member along cam surfaces and, when the first member has been guided in the connecting position, the same cam surfaces press against each other, supplying an axially directed force which deforms a resilient o-ring to provide a leak-proof seal.

6 Claims, 9 Drawing Figures

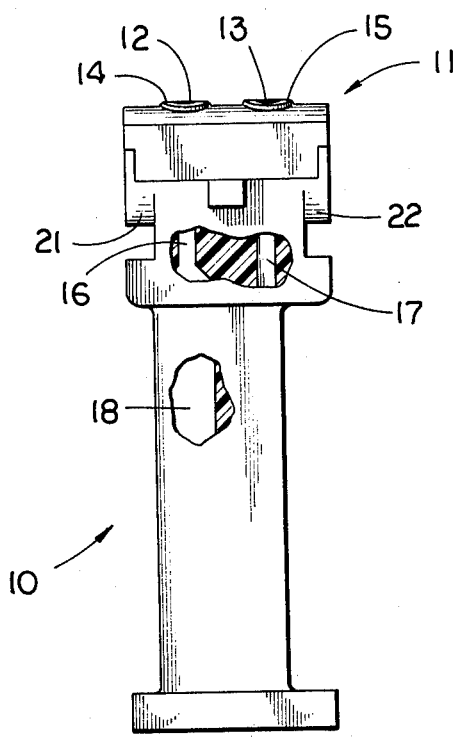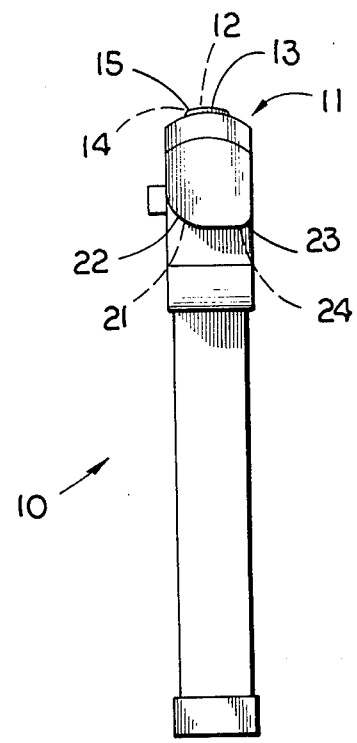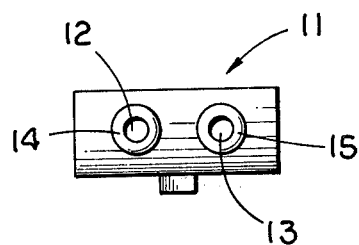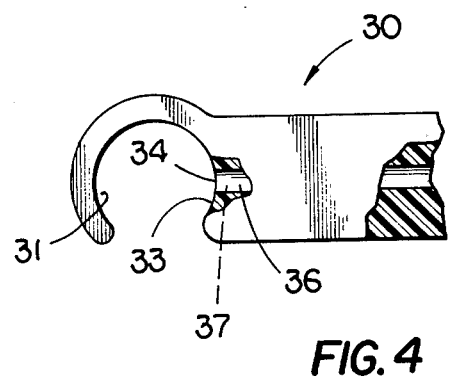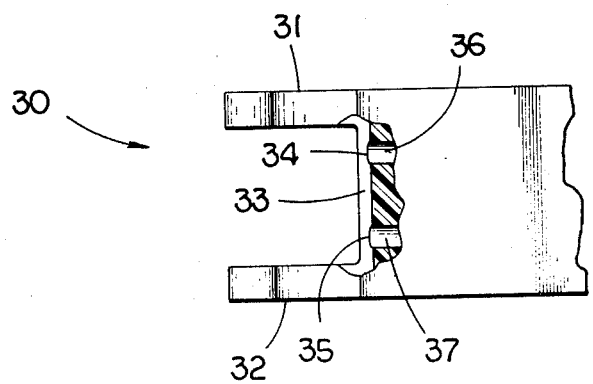

4,258,940

SEALING CONNECTOR FOR LIQUID AND GAS SYSTEMS

BACKGROUND OF THE INVENTION

1. Field of the Invention

The field of the invention is connectors which are easily attachable and detachable and provide a sealing relationship for a passageway. More specifically, the invention relates to such connectors which are used to attach and detach a resin column cassette to a chemical analyzing system.

2. Brief Description of the Prior Art

There are numerous types of connectors in the prior art which generally relate to the connecting of two members and the maintaining of the connection. Where the members to be connected have passageways, some connectors also provide a seal to avoid leakage. The following patents illustrate various types of connectors which utilize a pivoting action to make the connection, generally about hooks and generally maintaining the connection by a snapping or latching action.

Leatherman U.S. Pat. No. 608,000 discloses a pipe coupling in which one member has hooks which pivot about a receiving seat located on a second member. The connected position is latched on the opposite side of the connecting members by a locking lever having a spring release. Kennedy U.S. Pat. No. 2,098,423 also discloses a coupling device in which one connecting member also has hooks which pivot about a receiving seat. Latching is accomplished by a locking pin on one member which enters into a recess located on the second member.

Knight U.S. Pat. No. 2,794,961 discloses a clamp for a detachable mast. In Knight one member is fitted into a bore at the end of a second member. The clamp includes a first cam means which aids in the forcing of the first member into the second member and a second cam means which aids in forceably removing the first inner member.

Hinkel U.S. Pat. No. 3,426,179 discloses a safety coupling for hoisting, pulling or anchoring equipment of the type that is used in the oil and gas industry. The coupling is designed to allow movement between the connecting members up to and in excess of 90° without detachment. This is accomplished with compatible cam surfaces that allow free pivoting between the connecting members and which may only be disengaged when the connecting members are at a predetermined angle with respect to each other.

Demler U.S. Pat. No. 3,588,149 discloses a coupling device for vacuum or pressure systems. When two connecting members are pushed together in an axial direction the members are latched to each other. A seal is provided to avoid leakage.

In Barlow U.S. Pat. No. 3,886,970, a fluid pressure connector which is designed for use with a tractor and has a break away feature is disclosed. The device is spring loaded so that if sufficient axial force is applied side ramps which latch the connection in place are pivoted to release the connection.

In the prior art specifically relating to the connection and disconnection of resin columns in chemical analyzing systems, there generally are no convenient connectors. Connections have been made by connecting the individual tubes that run from the resin column to appropriate locations in the remainder of the system.

SUMMARY OF THE INVENTION

The present invention is a unique and novel connector that readily attaches and detaches, and provides a seal to prevent undesirable leakage when in the connected position. The present invention is particularly unique because the first member pivots into the connecting position by being guided along cam surfaces. When in the connecting position, the same cam surfaces apply an inward force, forcing the two connecting members against each other, thus resiliently deforming an o-ring to provide a leak-proof seal.

The connector of the present invention has a particular application for use in connecting a resin column cassette to a chemical analyzer machine. Such resin columns are used to filter radioactive materials, and therefore leakage is undesirable because it may expose the machine operator to radioactivity and also may generally contaminate the work area. Additionally, a connection which can be easily attached and detached has a significant advantage in convenience as compared to the most common prior means of attaching a resin column, which is by connecting the tubes individually to the appropriate locations in the machine.

It is an object of the present invention to provide a sealing connector that is both easily attachable and detachable, and can readily be seen whether it is in the attached position.

It is a further object of the invention to provide a sealing connector for liquid or gas systems in which there is a small risk of leakage during the attaching and detaching process.

It is a further object of the invention to provide a sealing connector in which there is a small risk of leakage when the connector is in the attached position.

These and other objects and advantages of the present invention will become more apparent from the following detailed description.

BRIEF DESCRIPTION OF THE DRAWINGS

FIGS. 1, 2 and 3 are various views of a first connecting member of the preferred embodiment.

FIGS. 1 and 2 show two side elevational views.

FIGS. 3 is a top plan view. FIG. 1 has two cut away sections, showing portions of the interior of the first member.

FIGS. 4, 5 and 6 are various views of a second connecting member of the preferred embodiment.

FIG. 4 is a side elevational view and

FIG. 5 is a top plan view.

FIG. 6 shows the connecting end surface area. FIGS. 4 and 5 have cut away sections, showing portions of the interior of the second member.

DETAILED DESCRIPTION OF THE PREFERRED EMBODIMENT

Figure 6:
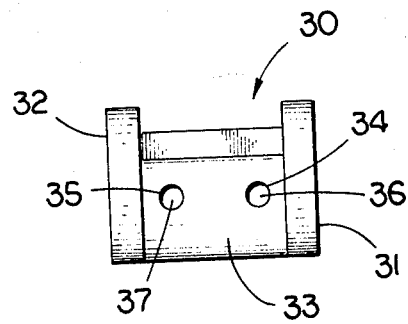

FIG. 1 is a side view of a first connecting member which will hereinafter be referred to as a cassette 10.

The cassette 10 has an end surface 11 which is generally semi-cylindrical in shape. The material defining the end surface 11 is preferrably resilient, and may suitably be made of an elastomeric material. Apertures 12 and 13 are located on end surface 11 and are surrounded by elastomer o-rings 14 and 15. O-rings 14 and 15 are secured to and project outwardly from end surface 11. Passageways 16 and 17 open on end surface 11 at apertures 12 and 13, respectively, and connect to a resin column 18 which is contained within the cassette 10. Cam surfaces 21 and 22 project outwardly from opposite sides of the cassette 10.

FIG. 2 is a second side view of the cassette 10, showing one of the cam surfaces 22. Apertures 12 and 13 and o-ring 14 cannot be seen in FIG. 2 as they are located behind o-ring 13. Their relative positions are indicated in FIG. 3. From the perspective of FIG. 2 the outwardly directing substantially semi-cylindrical or arcuate shape of end surface 11 and of cam surface 22 can be seen. FIG. 2 also reveals that cam surface portion 23 gradually increases and then gradually decreases in distance from the axis about which the generally cylindrical end surface 11 and cam surfaces 21 and 22 are centered. This produces a bump-like or ellipsoidal shape in the cam surface portion 23. Cam surface portion 24 is shaped in the same manner although it is not directly seen in FIG. 2.

FIG. 4 is a side view of a second member hereinafter referred to as connection apparatus 30, showing one of the cam surfaces 31 and the connecting end surface 33. Aperture 35, passageway 37, and cam surface 32 can not be seen directly in FIG. 4. FIGS. 5 and 6 more clearly show passageways 36 and 37 opening on the connecting end surface 33 at apertures 34 and 35, and show the relative location of the cam surfaces 31 and 32 on the sides of the connection apparatus 30. Cam surface 31 and 32 have an inwardly directing substantially cylindrical shape.

Cam surfaces 21 and 22 and cam surfaces 31 and 32 are compatible to each other, such that when the cassette 10 is rotatingly guided along the compatible cam surfaces relative to the connection apparatus 30, the cassette 10 rotates about a specific axis. This simplifies the attaching motion. Also, because the cassette is pivoted significantly in the attaching process, it can readily be seen whether the cassette is attached or detached from the connection. Also this compatability allows the end surface 11 to slide against the end surface 33 while the connection is being attached and detached, thus further reducing the risk of leakage.

Figure 7:
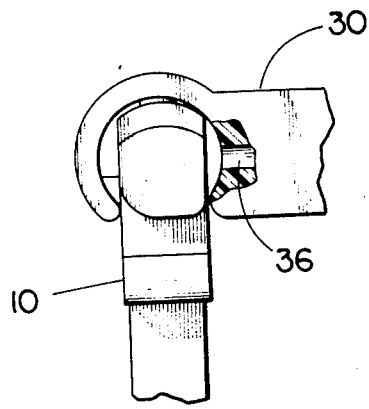
FIG. 7 is a side view showing the first member of FIG. 1 positioned with the second member of FIG. 4 such that the members can be rotatingly guided into a connected position by the cam surfaces of the members.
Figure 8:
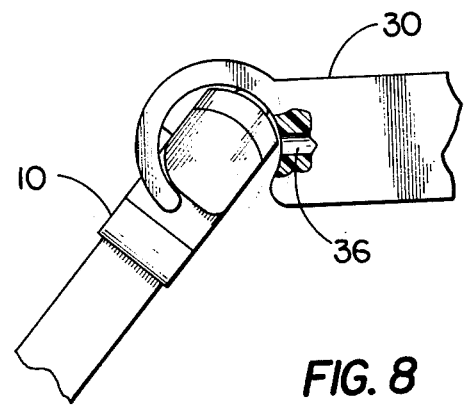
FIG. 8 is a view of the configuration of FIG. 7 after the first member has been partially rotated into a connected position.
Figure 9:
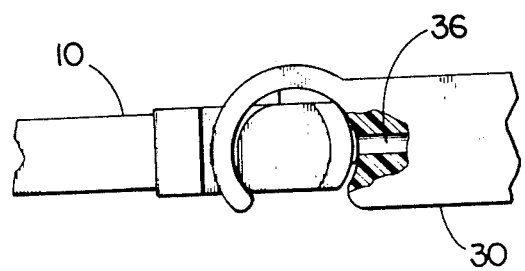
FIG. 9 shows the configuration of FIG. 7 after the first member has been completely rotated into a connected position with the second member.

FIGS. 7, 8 and 9 show various stages in the procedure of making a connection between a cassette 10 and a connection apparatus 30 of a chemical analyzing machine. These figures show the cassette 10 inserted into position and rotated along the cam surfaces 31 and 32 into a connected position. When in the connected position, the cam surfaces portions 23 and 24 press against cam surfaces 31 and 32 respectively, forcing the cassette against the connecting apparatus. Because the force is applied by the compatible cam surfaces, the connection is both easily attachable and detachable and no latching or snapping action is necessary to maintain the seal. Because the applied force is directed along the axis of the connection, a better seal is assured. In this position, o-rings 14 and 15 are resiliently deformed between the end surfaces to provide a sealing relationship. Because, the o-rings that act as a seal are located on the cassette, the o-rings are repeatedly replaced as new cassettes are used and thus the risk of leakage due to a worn out seal is diminished.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A sealing connector for liquid and gas systems comprising:
    a first member having an end surface defining first and second passageway openings;
    a second member having an end surface defining third and fourth passageway openings; and
    first and second resilient o-rings secured to one of said first and second members and surrounding each of the passageway openings of said member, said o-rings projecting outwardly from the end surface of said member;
    said first member having a shoulder facing away from the end surface, the shoulder having a first portion which is generally semi-cylindrical with a central axis parallel to a line between the first and second openings, the shoulder having a second portion extending further from the central axis than the semi-cylindrical first portion;
    said second member including a C-shaped arm extending beyond the end surface and defining a cam surface terminating at a point spaced apart from the end surface, the first and second portions of the shoulder of said first member and the cam surface of the arm of said second member being shaped and oriented to provide for connection of said first and second members by placement of the cam surface of the arm of said second member adjacent the first portion of the shoulder of said first member and rotation of said first member relative said second member about an axis parallel to the central axis, the cooperation of the cam surface of the C-shaped arm with the second portion of the shoulder upon rotation resulting in the end surface of said first member being forced against the end surface of said second member with said o-rings being resiliently deformed therebetween to provide a sealing relationship.

2. The sealing connector of claim 1 in which said first member includes a second shoulder aligned with and shaped the same as the first shoulder, and further in which said second member includes a second C-shaped arm aligned with and shaped the same as the first C-shaped arm, the pair of shoulders of said first member and the pair of C-shaped arms of said second member being shaped and oriented to provide for a connection of said first and second members by placement of the cam surfaces of the arms of said second member adjacent the first portions of the shoulders of said first member and rotation of said first member relative said second member about an axis parallel to the central axis.

3. The sealing connector of claim 2 in which said first and second o-rings are secured to said first member.

4. The sealing connector of claim 1 in which said first member is a portable cassette having a container.

5. The sealing connector of claim 4 in which the container of said first member is a resin column.

6. The sealing connector of claim 1 in which said first member end surface is substantially semi-cylindrical in shape and in which said second member end surface has a substantially semi-cylindrical shape which is compatible with said first member end surface.

* * * * *